(12) United States Patent
Datta et al.

(10) Patent No.: US 6,756,435 B2
(45) Date of Patent: Jun. 29, 2004

(54) SILICA-FILLED RUBBERS COMPRISING A QUINONE DIIMINE

(75) Inventors: Rabindra Nath Datta, Deventer (NL); Nicolaas Maria Huntink, Zutphen (NL); Auke Gerardus Talma, Bathmen (NL)

(73) Assignee: Akzo Nobel NV (NL)

( * ) Notice: Subject to any disclaimer, the term of this patent is extended or adjusted under 35 U.S.C. 154(b) by 87 days.

(21) Appl. No.: 10/015,468

(22) Filed: Dec. 11, 2001

(65) Prior Publication Data

US 2002/0151640 A1 Oct. 17, 2002

Related U.S. Application Data

(60) Provisional application No. 60/265,385, filed on Jan. 30, 2001.

(30) Foreign Application Priority Data

Dec. 20, 2000 (EP) .............................................. 00204661

(51) Int. Cl.⁷ ................................................. C08K 5/17
(52) U.S. Cl. ......................... 524/237; 524/80; 524/236; 524/302; 524/492
(58) Field of Search ................................. 524/237, 236, 524/492, 80, 302

(56) References Cited

U.S. PATENT DOCUMENTS

| | | | | |
|---|---|---|---|---|
| 5,208,280 A | * | 5/1993 | Wheeler | 524/100 |
| 5,534,574 A | * | 7/1996 | Sandstrom et al. | 524/262 |
| 6,053,226 A | * | 4/2000 | Agostini | 152/209.5 |
| 6,186,202 B1 | * | 2/2001 | Majumdar et al. | 152/209.6 |
| 6,296,329 B1 | * | 10/2001 | Rodgers et al. | 305/165 |

FOREIGN PATENT DOCUMENTS

| | | | | |
|---|---|---|---|---|
| WO | WO 99/20687 | * | 4/1999 | |
| WO | WO 00/05300 | | 2/2000 | C08K/5/17 |

OTHER PUBLICATIONS

N–(1,3–dimethylbutyl)–N–phenyl–p–quinone diimine (Q–Flex QDI®) *A Multifunctional Chemical for the Rubber Industry—Review and Current Status*; R. Datta, et al.; pp. 457–463; and English translation.
Rubber Technology Handbook; pp. 230–233; W. Hoffman (1980).
Rubber Technology Handbook; pp. 268–277; W. Hoffman (1980).
Rubber Technology Handbook; pp. 276–295; W. Hoffman (1980).
European Search Report, dated May 10, 2001 for EP 00 20 4661.

* cited by examiner

*Primary Examiner*—David W. Wu
*Assistant Examiner*—Henry S. Hu
(74) *Attorney, Agent, or Firm*—Louis A. Morris

(57) ABSTRACT

The invention relates to a silica-filled, sulfur-vulcanizable rubber composition comprising an unsaturated rubber, 20 to 100 phr of a silica, 1.6 to 8 phr of a silica coupling agent, 0.05 to 5 phr of an antidegradant, 0.1 to 5 phr of a vulcanization accelerator, 0.1 to 10 phr of sulfur, and 0.5 to 5 phr of a quinone diimine, with the proviso that the antidegradant is not a quinone diimine. The invention also relates to a vulcanization process comprising mixing and heating said rubber composition and to rubber articles, such as pneumatic tires, comprising the rubber vulcanizate obtained by said process.

12 Claims, No Drawings

SILICA-FILLED RUBBERS COMPRISING A QUINONE DIIMINE

CROSS REFERENCE TO RELATED APPLICATION

This application claims priority from U.S. Provisional Application No. 60/265,385, filed Jan. 30, 2001 and EP Application No. 00204661.3, filed Dec. 20, 2000, the entire contents of which are incorporated by reference herein.

BACKGROUND OF THE INVENTION

1. Field of the Invention

The present invention relates to a silica-filled, sulfur-vulcanizable rubber composition.

2. Prior Art

Most rubber compositions contain a reinforcing filler such as a carbon black or a combination of a carbon black with a light-colored or white filler such as a silica or a silicate. Rubber compositions comprising relatively large amounts of a silica or a silicate are well-known in the art and pneumatic tires with rubber treads made from such compositions are generally referred to as so-called "green tires." These rubber compositions typically do not contain a carbon black, or only contain a small amount of a carbon black, typically 5 to 20 phr.

It is well-known in the art that the dispersion of silica in rubber, especially in green tire rubber compositions, presents a problem—due to poor interaction between the filler and the rubber and strong filler-filler interaction—and that mixing is difficult as well as power- and time-consuming. Poor dispersion of silica in rubber leads to deteriorated physical and dynamic properties of the vulcanizate, in particular to increased hysteresis and increased heat build-up. In order to improve the dispersion, it is conventional to use a silica coupling agent, such as bis-(3-triethoxysilylpropyl)tetrasulfide (Si-69), a silane coupling agent sold by Degussa. Silica and silica coupling agents are typically used in passenger car tire treads. The silica/silane coupling agent system improves the wear of the tire tread (i.e. improves abrasion resistance) and improves the dynamic properties of the rubber vulcanizate; in particular it reduces hysteresis, which can be translated into better rolling resistance—leading to fuel savings—without a negative effect on wet grip.

However, when use is made of such known silica coupling agents, the dispersion still is not optimal under standard mixing conditions. Furthermore, as a result of using a silane coupling agent volatile alcohols are formed, which escape from the rubber composition and present an environmental problem. In addition, a reduction of the amount of silica coupling agents is desired, since their use in conventional amounts adds to the costs of the rubber vulcanizate.

The present invention provides a solution to the aforementioned problems.

SUMMARY OF THE INVENTION

In accordance with the primary embodiment of the present invention, there is provided a silica-filled, sulfur-vulcanizable rubber composition comprising an unsaturated rubber, 20 to 100 phr of a silica, 1.6 to 8 phr of a silica coupling agent, 0.05 to 5 phr of an antidegradant, 0.1 to 5 phr of a vulcanization accelerator, 0.1 to 10 phr of sulfur, and 0.5 to 5 phr of a quinone diimine, with the proviso that the antidegradant is not a quinone diimine.

Other embodiments of the invention encompass details about specific composition ingredients and additives, the use of the composition of the invention in rubber compositions and products obtained thereby, all of which are hereinafter disclosed in the following discussion of each of the facets of the invention.

DETAILED DESCRIPTION OF THE INVENTION

In the context of the present invention, the term "silica" comprises silicas and silicates.

In this application, the abbreviation "phr" means the number of parts by weight per 100 parts by weight of rubber. In the case of a rubber blend, it is based on 100 parts by weight of total rubber.

Quinone diimines are known compounds in the rubber industry. WO 99/20687 relates to the high-temperature mixing of elastomeric material in the presence of a quinone diimine antidegradant and carbon black, prior to vulcanization. It is described that by mixing the quinone diimine with the elastomer prior to vulcanization, enhanced handling and processing qualities are realized in the vulcanized rubber.

Up to now quinone diimines have only been reported for use as antidegradants. Their use in silica-filled rubbers, in particular green tire rubbers, has not been disclosed or suggested in the art of rubber technology.

Any quinone diimine may be used in the silica-filled, sulfur-vulcanizable rubber composition of the present invention. Quinone diimines are known compounds in the art of rubber technology. Preferably, a p-quinone diimine is used in accordance with the present invention.

Preferably, the quinone diimine to be used in accordance with the present invention is selected from the group consisting of N-isopropyl-N'-phenyl-p-quinone diimine, N-(1,3-dimethylbutyl)-N'-phenyl-p-quinone diimine, N,N'-bis-(1,4-dimethylpentyl)-p-quinone diimine, N,N'-bis-(1-ethyl-3-methylpentyl)-p-quinone diimine, N,N'-diphenyl-p-quinone diimine, N,N'-ditolyl-p-quinone diimine, and N,N'-di-β-naphthyl-p-quinone diimine.

In the rubber composition of the present invention, preferably an amount of 0.5 to 3.5, more preferably 0.5 to 2, most preferably 0.5 to 1.5 phr of a quinone diimine is used.

The rubber that is used in accordance with the instant invention is an unsaturated rubber. Preferably, the rubber is selected from the group consisting of styrene-butadiene rubber (SBR), butadiene rubber (BR), natural rubber (NR), isoprene rubber (IR), and mixtures thereof, such as a blend of SBR and BR. In green tires, typically solution polymerization-derived SBR is used.

The silica reinforcing filler that is used in accordance with the present invention is well-known to the person skilled in the art. The reader is referred to W. Hofmann, *Rubber Technology Handbook*, Hanser Publishers, Munich 1989, in particular pages 277–294. Preferably, in the composition of the present invention a high-surface area silica or silicate, or a mixture thereof, is used. The silica-filled, sulfur-vulcanizable rubber composition in accordance with the present invention preferably contains 40 to 100, more preferably 50 to 90, most preferably 60 to 90 phr of a silica.

Any silica coupling agent may be used in accordance with the present invention. Preferably, a silane coupling agent is used.

The silica coupling agent is used in a conventional amount, i.e. 1.6 to 8, preferably 1.6 to 6, more preferably 3.2 to 6, most preferably 3.2 to 5 phr. In general, high-surface area silicas and silicates require more silica coupling agent than low-surface area fillers. Typically, for a silica having a surface area of 180 m²/g BET, 8 wt % (i.e. 6.4 phr) of Si-69—based on the weight of the silica—is used.

In the composition of the invention sulfur, a sulfur donor or a mixture thereof is employed. The amount of sulfur to be compounded with the rubber usually is 0.1 to 10, preferably 0.1 to 5, more preferably 0.5 to 3 phr. If a sulfur donor is used, the amount thereof should be calculated in terms of the amount of sulfur.

Typical examples of sulfur donors that can be used in accordance with the present invention include dithiodimorpholine, caprolactam disulfide, tetramethylthiuram disulfide, and dipentamethylenethiuram tetrasulfide. The reader is referred to W. Hofmann, *Rubber Technology Handbook*, Hanser Publishers, Munich 1989, in particular pages 231–233.

In the composition of the invention either a single vulcanization accelerator or a mixture of accelerators can be employed. For vulcanization accelerators that can be used in accordance with the present invention the reader is referred to W. Hofmann, *Rubber Technology Handbook*, Hanser Publishers, Munich 1989.

Typical vulcanization accelerators include thiazole- and benzothiazole-based accelerators, for example 2-mercaptobenzothiazole and bis(2-benzothiazolyl) disulfide, benzothiazole-2-sulfenamide-based accelerators, such as N-cyclohexyl-benzothiazole-2-sulfenamide, N-tert-butyl-benzothiazole-2-sulfenamide (TBBS), N,N-dicyclohexyl-benzothiazole-2-sulfenamide, and 2-(morpholinothio)benzothiazole, thiophosphoric acid derivatives, thiurams, dithiocarbamates, diphenylguanidine (DPG), diorthotolyl guanidine, dithiocarbamyl sulfenamides, xanthates, and mixtures of one or more of these accelerators. Preferably, the vulcanization accelerator comprises a benzothiazole-2-sulfenamide. A combination of a benzothiazole-2-sulfenamide and diphenylguanidine is particularly preferred.

In the composition of the present invention the vulcanization accelerator usually is employed in an amount of 0.1 to 5, preferably 0.3 to 3, most preferably 0.5 to 2.5 phr.

In the rubber composition in accordance with the present invention an antidegradant is included. The antidegradant is not a quinone diimine. Examples of suitable antidegradants can be found in W. Hofmann, *Rubber Technology Handbook*, Hanser Publishers, Munich 1989 pp. 268–277.

An amount of 0.05 to 5, preferably 0.5 to 5, more preferably 1 to 3, even more preferably 1 to 2 phr of an antidegradant is used in the composition of the invention.

Preferably, the antidegradant is a p-phenylenediamine. Preferably, the p-phenylenediamine is selected from the group consisting of N-isopropyl-N'-phenyl-p-phenylenediamine, N-(1,3-dimethyl-butyl)-N'-phenyl-p-phenylenediamine (6PPD), N,N'-bis-(1,4-dimethyl-pentyl)-p-phenylene-diamine, N,N'-bis-(1-ethyl-3-methylpentyl)-p-phenylenediamine, N,N'-diphenyl-p-phenylenediamine, N,N'-ditolyl-p-phenylenediamine, and N,N'-di-β-naphthyl-p-phenylenediamine.

Conventional rubber additives may also be included in the silica-filled, sulfur-vulcanizable rubber composition in accordance with the present invention. Examples include processing oils, such as aromatic oils, tackifiers, waxes, (phenolic) antioxidants, antiozonants, pigments, e.g. titanium dioxide, resins, plasticizers, factices, vulcanization activators, such as stearic acid and zinc oxide, and fillers such as carbon black. These conventional rubber additives may be added in amounts known to the person skilled in the art of rubber compounding. The reader is also referred to the examples that are described below. As mentioned above, carbon black may be included in the composition of the instant invention, typically in an amount of 5 to 20 phr.

Further, vulcanization inhibitors, i.e. scorch retarders, such as cyclohexyl-thiophthalimide, phthalic anhydride, pyromellitic anhydride, benzene hexacarboxylic trianhydride, 4-methylphthalic anhydride, trimellitic anhydride, 4-chlorophthalic anhydride, salicylic acid, benzoic acid, maleic anhydride, citraconic anhydride, itaconic anhydride, and N-nitrosodiphenyl-amine may be included in conventional, known amounts. For further details on these typical rubber additives and vulcanization inhibitors, see W. Hofmann, *Rubber Technology Handbook*, Hanser Publishers, Munich 1989.

Finally, in rubber compositions for specific applications it may also be desirable to include steel cord adhesion promoters such as cobalt salts and dithiosulfates in conventional, known quantities.

A preferred silica-filled, sulfur-vulcanizable rubber composition in accordance with the present invention comprises styrene-butadiene rubber (SBR), preferably solution SBR, 40 to 100 phr of a silica, 1.6 to 6 phr of a silica coupling agent, more preferably a silane coupling agent, 0.5 to 5 phr of an antidegradant, 0.3 to 3 phr of a vulcanization accelerator, more preferably comprising a benzothiazole-2-sulfenamide, most preferably a combination of a benzothiazole-2-sulfenamide and diphenylguanidine, 0.1 to 5 phr of sulfur and/or a sulfur donor, and 0.5 to 3.5 phr of a quinone diimine.

The silica-filled, sulfur-vulcanizable rubber composition of the present invention is mixed and vulcanized in a conventional way, i.e. mixing and vulcanization are carried out using means and equipment that are well-known to a person skilled in the art. Suitable mixing and vulcanization procedures are described in W. Hofmann, *Rubber Technology Handbook*, Hanser Publishers, Munich 1989.

The vulcanization process typically is carried out at a temperature of 110–200, preferably 120–190, more preferably 140–180° C., for a period of time of up to 12, preferably up to 6, more preferably up to 3 hours, most preferably up to 1 hour.

The present invention also pertains to articles of manufacture, such as pneumatic tires, e.g., for passenger cars and trucks, and industrial rubber goods, which comprise the rubber vulcanizate obtained by vulcanizing the rubber composition in accordance with the present invention in a conventional way.

The present invention is illustrated by the following Examples.

EXAMPLES

In Table 1, rubber compositions typical for tire treads are shown. Comparative Examples A, B, and C: control without a quinone diimine. Examples 1 and 2: with N-(1,3-dimethylbutyl)-N'-phenyl-p-quinone diimine.

The rubber compositions of Table 1 were mixed according to the following conventional mixing procedure:
1. First mixing (start temp. 30° C., cool at 90° C.):

| | |
|---|---|
| t = 0 | SBR + BR |
| t = 1 | ½ silica (KS 408 gr) + Si-69 |
| t = 2 | ½ silica + oil + rest |
| t = 3 | sweep |
| t = 4 | dump |

2. Second mixing: t=0, mix from step 1, start with 144 rpm until temp. of the Banbury mixer reaches 125° C., reduce to 72 rpm and maintain temp. on the clock between 130–135° C. for 5 min. by lifting the ram. The needle temp. is to be kept between 150–157° C.

3. Mill mixing: final mixing on two-roll mill at approx. 50–70° C. according to ASTM procedure.

The rubber compositions were vulcanized by compression molding at 170° C. for a period of time as indicated in the Tables below. After cooling the vulcanized rubber sheets for 24 h, test pieces were cut and their properties were determined.

The rheological properties were determined on a Monsanto Rheometer MDR2000E, arc 0.5°, 170° C./60 min. Scorch time ($t_s2$) is the time to increase the torque 2 dNm above the minimum torque ($M_L$). Optimum vulcanization time ($t_{90}$) is the time at 90% of the maximum torque ($M_H$). $T_{end}$ is the time at the rheometer and is set at 1 h. Delta torque (Delta S) is the difference between the minimum and the maximum torque. The difference between optimum vulcanization time and scorch time is a measure of the cure rate.

Heat build-up (HBU) measurements, i.e. determination of the needle temperature, were carried out in accordance with ASTM D623/A (load: 10.8 kg; stroke: 4.45 mm; duration: 30 min; start temp.: 100° C.).

The Payne effect, i.e., the decrease in storage modulus in the strain area 0.7% -25%, was determined on an RPA2000 at 100° C. and 20 cpm.

The dynamic mechanical (i.e. viscoelastic) properties were determined using a Metravib R. D. S. viscoanalyzer (deformation type: tension-compression; temp.: 60° C.; frequency: 15 Hz; dynamic strain: strain sweep of 0.01% to 10% strain, i.e. 9 intervals on a logarithmic scale). Hysteresis (i.e. tangent delta) is the percentage of energy lost per cycle of deformation.

The interaction between filler and rubber is expressed in the art in the form of a Payne effect and in the form of an interaction parameter $\sigma/\eta$. From the RPA2000 measurements (viscoelastic data), the Payne effect, $\eta$ (in MPa), is calculated (i.e. the difference in storage modulus at 0.7% strain and 25% strain). The lower the number for $\eta$, the better the silica dispersion. The interaction parameter is calculated from the Payne effect and the difference in modulus 300 and modulus 100 (i.e. $\sigma$) according to the formula $\sigma/\eta \times 100$. The higher the number, the better the silica to rubber coupling.

Crosslink density and types of crosslinks were determined according to the methods known in the art.

TABLE 1

Rubber compositions

| | A | B | 1 | C | 2 |
|---|---|---|---|---|---|
| SBR Buna 5025-1 | 103.13 | 103.13 | 103.13 | 103.13 | 103.13 |
| BR Buna CB 10 | 25.0 | 25.0 | 25.0 | 25.0 | 25.0 |
| KS 408 gr | 80.0 | 80.0 | 80.0 | 80.0 | 80.0 |
| Si-69 | 6.7 | 5.4 | 5.4 | 4.5 | 4.5 |
| Aromatic oil | 8.0 | 8.0 | 8.0 | 8.0 | 8.0 |
| Zinc oxide | 3.0 | 3.0 | 3.0 | 3.0 | 3.0 |
| Stearic acid | 2.0 | 2.0 | 2.0 | 2.0 | 2.0 |
| 6PPD | 2.0 | 2.0 | 2.0 | 2.0 | 2.0 |
| Quinone diimine | — | — | 1.0 | — | 1.0 |
| Wax PEG 4000 | 3.14 | 3.14 | 3.14 | 3.14 | 3.14 |
| Santocure TBBS | 1.70 | 1.70 | 1.70 | 1.70 | 1.70 |
| Perkacit DPG | 2.0 | 2.0 | 2.0 | 2.0 | 2.0 |
| Sulfur | 1.5 | 1.5 | 1.5 | 1.5 | 1.5 |

TABLE 2

Cure characteristics at 170° C.

| | A | B | 1 | C | 2 |
|---|---|---|---|---|---|
| Delta S (Nm) | 2.29 | 2.31 | 2.10 | 2.16 | 2.17 |
| $M_L$ (Nm) | 0.32 | 0.31 | 0.27 | 0.36 | 0.30 |
| $t_s2$ (min) | 1.19 | 0.87 | 1.26 | 1.03 | 0.96 |
| $t_{90}$ (min) | 21.3 | 19.6 | 13.7 | 17.7 | 16.5 |
| $t_{90}-t_s2$ (min) | 20.1 | 18.7 | 12.44 | 16.7 | 15.5 |

The data in Tables 1 and 2 shows that when the amount of silica coupling agent (i.e. Si-69) is decreased, scorch time (i.e. $t_s2$)—or scorch safety—is decreased as well (Comparative Example A versus Comparative Example B). Incorporation of a quinone diimine improved scorch safety and resulted in a shorter cure time (i.e. $t_{90}$) and a higher cure rate (i.e. $t_{90}-t_s2$) (Comparative Example B versus Example 1). The data further shows that incorporation of a quinone diimine allowed for a further reduction of the amount of silane coupling agent.

TABLE 3

Properties of rubber vulcanizates

| | A | B | 1 |
|---|---|---|---|
| Cure temp./time | 170° C./20' | 170° C./20' | 170° C./15' |
| M100 (MPa) | 4.0 | 3.7 | 3.8 |
| M300 (MPa) | 14.6 | 13.9 | 14.2 |
| Tensile (MPa) | 16.5 | 14.2 | 17.1 |
| Elongation (%) | 315 | 370 | 350 |
| Tear strength (kN/m) | 60 | 55 | 60 |
| Heat build-up (° C.) | 34 | 39 | 36 |
| Abrasion loss (mm$^3$) | 102 | 118 | 96 |

The data in Table 3 shows that the effects of reducing the amount of silane coupling agent, e.g. decreased tensile modulus, increased heat build-up, and increased abrasion loss, are compensated for by the use of a quinone diimine.

TABLE 4

Viscoelastic properties of rubber vulcanizates

| | A | B | 1 |
|---|---|---|---|
| Cure temp./time | 170° C./20' | 170° C./20' | 170° C./15' |
| Elastic Modulus (MPa) | 7.41 | 7.01 | 7.20 |
| Viscous Modulus (MPa) | 0.815 | 0.862 | 0.756 |
| Tangent delta | 0.110 | 0.123 | 0.105 |
| Loss compliance (MPa$^{-1}$) | 0.0148 | 0.0175 | 0.0146 |

The data in Table 4 shows that the use of a quinone diimine results in compensation of the hysteresis loss (i.e. tangent delta) seen when the amount of silane coupling agent in the rubber composition is reduced.

The restored tensile modulus and hysteresis upon inclusion of a quinone diimine in the rubber composition are an indication of the chemical coupling of silica to rubber.

TABLE 5

Payne effect and interaction parameter

| | M300 − M100 ($\sigma$) | Gmax − Gmin Payne effect ($\eta$) | Interaction parameter ($\sigma/\eta \times 100$) |
|---|---|---|---|
| A | 10.6 | 0.92 | 1150 |
| 1 | 10.9 | 0.37 | 2940 |

The data in Table 5 shows that the rubber vulcanizate cured in the presence of a quinone diimine has an improved Payne effect and interaction parameter—and thus a better silica to rubber interaction—than a rubber cured in the absence thereof.

TABLE 6

Crosslink density and crosslink types[1]

| Cure temp./time | A<br>170° C./20' | B<br>170° C./20' | 1<br>170° C./15' |
|---|---|---|---|
| Total crosslinks | 5.01 | 4.81 | 4.90 |
|  | (5.41) | (5.10) | (5.23) |
| Poly-S | 2.65 | 2.10 | 2.57 |
|  | (1.01) | (0.82) | (1.41) |
| Di-S | 0.67 | 0.51 | 0.58 |
|  | (0.50) | (0.40) | (0.45) |
| Mono-S | 1.69 | 2.20 | 1.75 |
|  | (3.90) | (3.88) | (3.37) |

[1]Values in parentheses are those after air ageing at 100° C. for 3 days.

The data in Table 6 shows that the use of a quinone diimine results in an improved retention of polysulfide crosslinks (i.e. Poly-S) at a reduced amount of silane coupling agent and in a shorter cure time. As a result, improved ageing properties were found.

What is claimed is:

1. A silica-filled, sulfur-vulcanizable rubber composition comprising rubber made from unsaturated monomers, 20 to 100 phr of a silica, 1.6 to 8 phr of a silica coupling agent, 0.05 to 5 phr of an antidegradant, 0.1 to 5 phr of a vulcanization accelerator, 0.1 to 10 phr of sulfur, and 0.5 to 5 phr of a quinone diimine, with the proviso that the antidegradant is not a quinone diimine.

2. The composition of claim 1 wherein the composition comprises 0.5 to 3.5 phr of a quinone diimine.

3. The composition of claim 1 wherein the quinone diimine is selected from the group consisting of N-isopropyl-N'-phenyl-p-quinone diimine, N-(1,3-dimethylbutyl)-N'-phenyl-p-quinone diimine, N,N'-bis-(1,4-dimethylpentyl)-p-quinone diimine, N,N'-bis-(1-ethyl-3-methylpentyl)-p-quinone diimine, N,N'-diphenyl-p-quinone diimine, N,N'-ditolyl-p-quinone diimine, and N,N'-di-β-naphthyl-p-quinone diimine.

4. The composition of claim 1 wherein the antidegradant is a p-phenylenediamine.

5. The composition of claim 4 wherein the p-phenylenediamine is selected from the group consisting of N-isopropyl-N'-phenyl-p-phenylenediamine, N-(1,3-dimethyl-butyl)-N'-phenyl-p-phenylenediamine (6PPD), N,N'-bis-(1,4-dimethyl-pentyl)-p-phenylene-diamine, N,N'-bis-(1-ethyl-3-methylpentyl)-p-phenylenediamine, N,N'-diphenyl-p-phenyl-enediamine, N,N'-ditolyl-p-phenylenediamine, and N,N'-di-β-naphthyl-p-phenylenediamine.

6. The composition of claim 1 wherein the rubber is selected from the group consisting of styrene-butadiene rubber, butadiene rubber, natural rubber, isoprene rubber, and mixtures thereof.

7. The composition of claim 1 wherein the composition comprises 1.6 to 6 phr of a silica coupling agent.

8. The composition of claim 7 wherein the silica coupling agent is a silane coupling agent.

9. The composition of claim 1 wherein the composition comprises 40 to 100 phr of a silica.

10. A vulcanization process comprising mixing and heating the rubber composition of claim 1 at a temperature of 110–200° C. for a period of time of up to 12 hours.

11. An article of manufacture comprising the rubber vulcanizate obtained by the process of claim 10.

12. The article of manufacture of claim 11 comprising a pneumatic tire.

\* \* \* \* \*

UNITED STATES PATENT AND TRADEMARK OFFICE
CERTIFICATE OF CORRECTION

PATENT NO. : 6,756,435 B2
DATED : June 29, 2004
INVENTOR(S) : Rabindra Nath Datta, Nicolaas Maria Huntink and Auke Gerardus Talma It is certified that error appears in the above-identified patent and that said Letters Patent is hereby corrected as shown below:

<u>Title page,</u>
Item [73], Assignee, change from "Akzo Nobel N.V." to -- Flexsys B.V. --

Signed and Sealed this

Twenty-eighth Day of September, 2004

JON W. DUDAS
*Director of the United States Patent and Trademark Office*